US012576874B2

(12) United States Patent
Lawrence et al.

(10) Patent No.: US 12,576,874 B2
(45) Date of Patent: Mar. 17, 2026

(54) DRIVER SCORING SYSTEM AND METHOD USING OPTIMUM PATH DEVIATION

(71) Applicant: Intel Corporation, Santa Clara, CA (US)

(72) Inventors: Sean J. Lawrence, Bangalore (IN); Raghavendra Bhat, Bangalore (IN); Pravin Chander Chandran, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 904 days.

(21) Appl. No.: 17/560,405

(22) Filed: Dec. 23, 2021

(65) Prior Publication Data

US 2022/0111865 A1      Apr. 14, 2022

(51) Int. Cl.
| | |
|---|---|
| *B60W 60/00* | (2020.01) |
| *B60W 30/18* | (2012.01) |
| *G01C 21/00* | (2006.01) |
| *G01C 21/34* | (2006.01) |

(52) U.S. Cl.
CPC .... *B60W 60/001* (2020.02); *B60W 30/18109* (2013.01); *G01C 21/3476* (2013.01); *G01C 21/3896* (2020.08); *B60W 2420/403* (2013.01); *B60W 2554/4041* (2020.02)

(58) Field of Classification Search
None
See application file for complete search history.

(56) References Cited

U.S. PATENT DOCUMENTS

| | | | | |
|---|---|---|---|---|
| 9,207,675 | B1* | 12/2015 | Walser | G01C 21/3807 |
| 2014/0039749 | A1* | 2/2014 | Jelbert | G07C 5/085 |
| | | | | 701/32.1 |
| 2016/0093124 | A1* | 3/2016 | Shi | B64C 29/0025 |
| | | | | 701/2 |
| 2017/0330455 | A1 | 11/2017 | Kikuchi et al. | |
| 2018/0174485 | A1* | 6/2018 | Stankoulov | G09B 19/167 |

(Continued)

FOREIGN PATENT DOCUMENTS

| | | |
|---|---|---|
| DE | 102018220782 A1 | 6/2020 |
| EP | 1790946 A2 | 5/2007 |

(Continued)

OTHER PUBLICATIONS

Aug. 23, 2023 (EP) Search Report—App. 22212591.6.

*Primary Examiner* — Anne Marie Antonucci
*Assistant Examiner* — Kyle S Park
(74) *Attorney, Agent, or Firm* — Banner & Witcoff, Ltd.

(57) ABSTRACT

Techniques are disclosed to determine driver scoring that consider deviations in map and sensor data in driver score computations. The deviations can be based on deviations from an optimum driving path, and include the determination of vectors between a reference point and one or more landmarks, and one or more reference vectors between the reference point the landmark(s) when traveling on an optimum driving path. A difference between the vectors may then be used determine the deviations from the optimum driving path. In contrast to the conventional approaches, the use of positional deviations (e.g. determined from road markings) in the computation of driver scores allows for improved driver scoring techniques and driver characterizations.

20 Claims, 15 Drawing Sheets

500

(56)                    References Cited

U.S. PATENT DOCUMENTS

| | | | | |
|---|---|---|---|---|
| 2018/0180740 | A1* | 6/2018 | Shaffer | ................ G05D 1/0236 |
| 2018/0224285 | A1* | 8/2018 | Stajner | ................ G09B 29/004 |
| 2019/0056231 | A1* | 2/2019 | Bai | .......................... G06N 5/04 |
| 2020/0081134 | A1* | 3/2020 | Wheeler | .............. G01S 19/396 |
| 2021/0107494 | A1 | 4/2021 | Silver | |
| 2022/0236077 | A1* | 7/2022 | Clarysse | ........... G01C 21/3626 |
| 2024/0290146 | A1* | 8/2024 | Brinkmann | ........... G07C 5/008 |

FOREIGN PATENT DOCUMENTS

| | | | |
|---|---|---|---|
| EP | 2778007 | A1 | 9/2014 |
| EP | 3343172 | A1 | 7/2018 |

* cited by examiner

800

Cumulative Distribution Function (CDF) of normalized OPD values

Score

Inverted OPD magnitude (Normalized wrt distance)

1100

Identify marker(s) 1102

Determine vector ($v'$) from reference point to identified marker(s) based on sensor or other data 1104

Determine vector ($v$) from reference point to the identified marker(s) based on map data (e.g. optimum path) 1106

1108

$|v - v'| \geq$ threshold

NO

YES

Apply driver characterization to determine driver score 1110

DRIVER SCORING SYSTEM AND METHOD USING OPTIMUM PATH DEVIATION

TECHNICAL FIELD

The disclosure described herein generally relates to driving scoring systems and methods for vehicles, including systems and methods configured to determine driver scores based on optimum path deviations.

BACKGROUND

Vehicle driver score algorithms may utilize data produced by driver behavior and events generated by the vehicle to determine a driver score. So called "smart" vehicles, which may include artificial intelligence and/or advanced driving assistance (ADAS) systems, may compute driver scores and use the computed scores for individual vehicles and fleets of vehicles (e.g. monitored by a Fleet Management Systems (FMS)) to provide insights into potential improvements and possible interventions to improve driving quality of the drivers. Conventional driver scoring techniques may utilize data produced by driver behavior and events generated by the vehicle. However, current driver scoring techniques have various drawbacks, including driver scoring being solely event/alert based.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the techniques discussed herein.

In the drawings, like reference characters generally refer to the same parts throughout the different views. The drawings are not necessarily to scale, emphasis instead generally being placed upon illustrating the principles of the disclosure. In the following description, reference is made to the following drawings, in which.

The present disclosure will be described with reference to the accompanying drawings. The drawing in which an element first appears is typically indicated by the leftmost digit(s) in the corresponding reference number.

DETAILED DESCRIPTION

Figure 1:
FIG. 1 illustrates a vehicle in accordance with the present disclosure.
Figure 1:
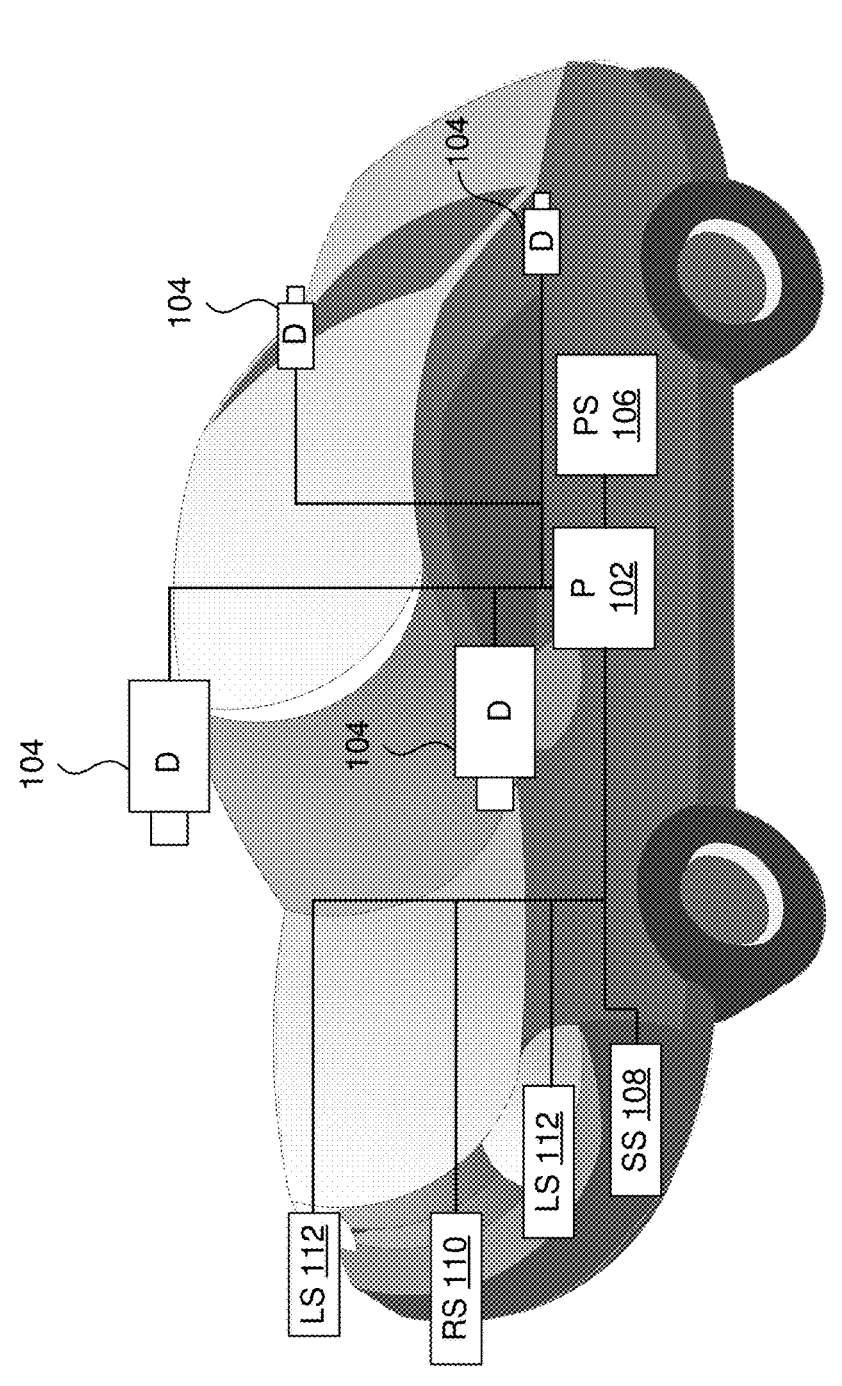

The following detailed description refers to the accompanying drawings that show, by way of illustration, exemplary details in which the disclosure may be practiced. In the following description, numerous specific details are set forth in order to provide a thorough understanding of the present disclosure. However, it will be apparent to those skilled in the art that the various designs, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

Conventional driver scoring techniques are event/alert-based and may utilize data produced by driver behavior and events/alerts generated by the vehicle. However, these conventional techniques do not consider data reflecting vehicle movements between the generation of events/alerts, such as data from one or more sensors, in driver score computations.

To address the shortcomings of conventional systems, the disclosure describes driver scoring techniques that consider dynamic movements of the vehicle and the associated data leading up to an event/alert and/or following an event/alert. In contrast to the conventional approaches described above, landmark detection and positional mapping are used to identify driving deviations from a desired (e.g. optimum) driving path, such as an optimum path for an autonomous vehicle, to provide an increased detail and advanced driving characterization to improve upon conventional scoring techniques.

The path deviation processing may also supplement conventional event/alert-based driver scoring techniques. Events may include harsh movements (such as acceleration, braking, and curving). Such harsh movements may also be referred to as harsh driving events, and may include: Harsh Acceleration (HA), Harsh Velocity (HV), Harsh Braking (HB), Harsh Curving (HC)/directional-change, or other harsh, sudden, or drastic vehicle maneuvers. Events may also be generated from Driver Monitoring Systems (DMS) that detect driver behavioral events, such as distracted-driver events, impaired-driver events, phone usage, smoking, and drowsiness. Additional events may include Collision Avoidance System (CAS) events, such as Forward Collision Warnings (FCW), Pedestrian Collision Warnings (PCW), Headway Monitoring Warnings (HWM) and other CAS alerts/events. The types of events are not limited hereto and may include any events that would be understood by one of ordinary skill in the art.

The vehicle or fleet of vehicles may implement a Safety Driving Model (SDM). The SDM functions to provide a mathematical framework that aims to ensure safety assurance of autonomous vehicles (AVs) and/or any suitable type of vehicle that implements at least some form of an autonomously-executed action or control without human assistance (fully-autonomous control functions, semi-autonomous control functions, etc.). Thus, the SDM is a comprehensive framework that was developed to ensure both longitudinal and lateral safety of vehicles (such as AVs) in various types of scenarios. The SDM (also referred to as a "driving policy model" or simply as a "driving model"), may be implemented as part of a fully or semi-autonomous vehicle control system, such as an advanced driving assistance (ADAS) system and/or a driving assistance and automated driving system.

A SDM may thus be represented as any suitable number of SDM parameters, any suitable subset of which being related as part of a mathematical model formalizing an interpretation of applicable laws, standards, policies, etc., which are applicable to self-driving (such as ground) vehicles and/or other suitable types of vehicles that may implement fully autonomous or semi-autonomous functions and which may utilize tools such as the aforementioned adaptive cruise control, automated braking or steering, etc. For instance, a SDM may be designed to achieve three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic, and in turn limit the scalability of system deployment; and third, the interpretation should be efficiently verifiable in the sense that it can be rigorously proven that the self-driving (autonomous) vehicle correctly implements the interpretation of the law. An implementation in a host vehicle of a SDM, illustratively, may be or include an implementation of a mathematical model for safety assurance that enables identification and performance of proper responses to dangerous situations such that self-perpetrated accidents can be avoided.

A SDM may implement logic that is applied to the SDM parameters to apply driving behavior rules such as the following five rules, for instance:

Do not hit someone from behind.

Do not cut-in recklessly.

Right-of-way is given, not taken.

Be careful of areas with limited visibility.

If you can avoid an accident without causing another one, you must do it.

It is to be noted that these rules are not limiting and not exclusive, and can be amended in various designs as desired. The rules rather represent a social driving contract that might be different depending on the region, and may also develop over time. While these five rules are currently applicable in most of the countries, they might not be complete and may be amended.

Vehicle and Accompanying Safety System

FIG. 1 shows a vehicle 100 including a safety system 200 (see also FIG. 2) in accordance with the present disclosure. The vehicle 100 and the safety system 200 are exemplary in nature, and may thus be simplified for explanatory purposes. Locations of elements and relational distances (as discussed above, the Figures are not to scale) are provided as non-limiting instances. The safety system 200 may include various components depending on the requirements of a particular implementation and/or application.

Figure 2:
FIG. 2 illustrates various electronic components of a safety system of a vehicle in accordance with the present disclosure.

As shown in FIG. 1 and FIG. 2, the safety system 200 may include one or more processors 102, one or more image acquisition devices 104 such as one or more cameras, one or more position sensors 106 such as a Global Navigation Satellite System (GNSS), a Global Positioning System (GPS), one or more memories 202, one or more map databases 204, one or more user interfaces 206 (such as a display, a touch screen, a microphone, a loudspeaker, one or more buttons and/or switches, and the like), and one or more wireless transceivers 208, 210, 212.

The wireless transceivers 208, 210, 212 may be configured to operate in accordance with any suitable number and/or type of desired radio communication protocols or standards. A wireless transceiver (a first wireless transceiver 208) may be configured in accordance with a Short Range mobile radio communication standard such as Bluetooth, Zigbee, and the like. A wireless transceiver (a second wireless transceiver 210) may be configured in accordance with a Medium or Wide Range mobile radio communication standard such as a 3G (Universal Mobile Telecommunications System-UMTS), a 4G (Long Term Evolution-LTE), or a 5G mobile radio communication standard in accordance with corresponding 3GPP (3rd Generation Partnership Project) standards.

A wireless transceiver (a third wireless transceiver 212) may be configured in accordance with a Wireless Local Area Network communication protocol or standard such as in accordance with IEEE 802.11 Working Group Standards, the most recent version at the time of this writing being IEEE Std 802.11™-2020, published Feb. 26, 2021 (such as 802.11, 802.11a, 802.11b, 802.11g. 802.11n, 802.11p, 802.11-12, 802.11ac, 802.11ad, 802.11ah, 802.11ax, 802.11ay, and the like). The one or more wireless transceivers 208, 210, 212 may be configured to transmit signals via an antenna system (not shown) using an air interface. One or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable communication protocols.

The one or more processors 102 may implement any suitable type of processing circuitry and architecture, and may be configured as a controller implemented by the vehicle 100 to perform various vehicle control functions. The one or more processors 102 may be configured to function as a controller for the vehicle 100 to analyze sensor data and received communications, to calculate specific actions for the vehicle 100 to execute, and to cause the corresponding action to be executed, which may be in accordance with an AV or ADAS system, for instance.

The one or more processors 102 may include one or more application processors 214A, 214B, an image processor 216, a communication processor 218, and additionally or alternatively may include any other suitable processing device not shown in the Figures. Similarly, image acquisition devices 104 may include any suitable number of image acquisition devices and components depending on the requirements of a particular application. Image acquisition devices 104 may include one or more image capture devices (such as cameras, charge coupling devices (CCDs), or any other type of image sensor). The safety system 200 may also include a data interface communicatively connecting the one or more processors 102 to the one or more image acquisition devices 104. A first data interface may include any wired and/or wireless first link 220, or first links 220 for transmitting image data acquired by the one or more image acquisition devices 104 to the one or more processors 102, such as to the image processor 216.

The wireless transceivers 208, 210, 212 may be coupled to the one or more processors 102, such as to the communication processor 218 via a second data interface. The second data interface may include any wired and/or wireless second link 222 or second links 222 for transmitting radio transmitted data acquired by wireless transceivers 208, 210, 212 to the one or more processors 102, such as to the communication processor 218. Such transmissions may also include communications (one-way or two-way) between the vehicle 100 and one or more other (target) vehicles in an environment of the vehicle 100 (such as to facilitate coordination of navigation of the vehicle 100 in view of or together with other (target) vehicles in the environment of the vehicle 100), or even a broadcast transmission to unspecified recipients in a vicinity of the transmitting vehicle 100. These communications may include messages and/or control messages that are transmitted between the vehicles while traveling together.

The memories 202 as well as the one or more user interfaces 206 may be coupled to each of the one or more processors 102, via a third data interface. The third data interface may include any wired and/or wireless third link 224 or third links 224. Furthermore, the position sensor 106 may be coupled to each of the one or more processors 102, via the third data interface.

Each processor 214A, 214B, 216, 218 of the one or more processors 102 may be implemented as any suitable number and/or type of hardware-based processing devices (processing circuitry), and may collectively, i.e. with the one or more processors 102, form one or more type of controllers as discussed herein. The architecture shown in FIG. 2 is provided for case of explanation, and the vehicle 100 may include any suitable number of the one or more processors 102, each of which may be similarly configured to utilize data received via the various interfaces and perform a specific task.

The one or more processors 102 may form a driver scoring controller that is configured to determine one or more driver scores and/or characterizations of a vehicle's movements or behaviors as discussed further herein, such as the determination of a driver score based on determined deviations from an optimum path, one or more alerts/events, traffic data, sensor data, map data, map metadata, map markers, and/or other data as would be understood by one of ordinary skill in the art. Landmark detection and positional mapping to identify the deviations. These determinations provide an increased detail and advanced driving characterization to improve upon conventional scoring techniques. The functions performed by the driver scoring controller may be implements in a single processor 102 or distributed across multiple of the processors 102. Additionally or alternatively, these determinations may be used to characterize and improve the operation of the processors 102 or other driving control systems, including evaluating the ADAS, the operation of the controller 300 and/or controller 301, and/or other driving management systems that calculate specific actions for the vehicle 100 to execute and to cause the corresponding action to be executed. This advantageously provides a system that is configured to improve the determination of an optimum driving path for the vehicle 100.

The driver scoring controller may receive data from respectively coupled components as shown in FIG. 2 via respective interfaces (220, 222, 224, 232, etc.), with the wireless transceivers 208, 210, and/or 212 providing data to the respective controller via the second links 222, which function as communication interfaces between the respective wireless transceivers 208, 210, and/or 212 and each respective controller.

The application processors 214A, 214B may individually represent respective controllers that work in conjunction with the one or more processors 102 to perform specific controller-related tasks. For instance, the application processor 214A may be implemented as a driver scoring controller, whereas the application processor 214B may be implemented as a different type of controller that is configured to perform other types of tasks as discussed further herein. The one or more processors 102 may receive data from respectively coupled components as shown in FIG. 2 via the various interfaces 220, 222, 224, 232, etc., and the communication processor 218 may provide communication data received from other vehicles (or to be transmitted to other vehicles) to each controller via the respectively coupled links 240A, 240B, which function as communication interfaces between the respective application processors 214A, 214B and the communication processors 218.

The one or more processors 102 may additionally be implemented to communicate with any other suitable components of the vehicle 100 to determine a state of the vehicle while driving or at any other suitable time. For instance, the vehicle 100 may include one or more vehicle computers, sensors, ECUs, interfaces, etc., which may collectively be referred to as vehicle components 230 as shown in FIG. 2. The one or more processors 102 are configured to communicate with the vehicle components 230 via an additional data interface 232, which may represent any suitable type of links and operate in accordance with any suitable communication protocol (such as CAN bus communications). Using the data received via the data interface 232, the one or more processors 102 may determine any suitable type of vehicle status information (vehicle data) such as the current drive gear, current engine speed, acceleration capabilities of the vehicle 100, etc.

In any event, the one or more processors may include any suitable number of other processors 214A. 214B, 216, 218, each of which may comprise a sub-processor and/or include a microprocessor, pre-processors (such as an image pre-processor), graphics processors, a central processing unit (CPU), support circuits, digital signal processors, integrated circuits, memory, or any other types of devices suitable for running applications and for data processing (image processing, audio processing, etc.) and analysis and/or to enable vehicle control to be functionally realized. Each processor 214A, 214B, 216, 218 may include any suitable type of single or multi-core processor, mobile device microcontroller, central processing unit, etc. These processor types may each include multiple processing units with local memory and instruction sets. Such processors may include video inputs for receiving image data from multiple image sensors, and may also include video out capabilities.

Any of the processors 214A, 214B, 216, 218 disclosed herein may be configured to perform certain functions in accordance with program instructions, which may be stored in a memory of the one or more memories 202. In other words, a memory of the one or more memories 202 may store software that, when executed by a processor (by the one or more processors 102, one or more of the processors 214A, 214B, 216, 218, etc.), controls the operation of the safety system 200. A memory of the one or more memories 202 may store one or more databases and image processing software, as well as a trained system, such as a neural network, or a deep neural network. The one or more memories 202 may include any number of random access memories, read only memories, flash memories, disk drives, optical storage, tape storage, removable storage, or any other suitable types of storage.

The safety system 200 may further include components such as a speed sensor 108 (such as a speedometer) for measuring a speed of the vehicle 100. The safety system may also include one or more accelerometers (either single axis or multiaxis) (not shown) for measuring accelerations of the vehicle 100 along one or more axes. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), digital compasses, and the like. The radar sensors 110 and/or the LIDAR sensors 112 may be configured to provide pre-processed sensor data, such as radar target lists or LIDAR target lists. The third data interface (one or more links 224) may couple the speed sensor 108, the one or more radar sensors 110, and the one or more LIDAR sensors 112 to at least one of the one or more processors 102.

The one or more memories 202 may store data in a database or in any different format, which may indicate a location of known landmarks. The one or more processors 102 may process sensory information (such as images, radar signals, depth information from LIDAR or stereo processing of two or more images) of the environment of the vehicle 100 together with position information, such as a GPS coordinate, a vehicle's ego-motion, etc., to determine a current location and/or orientation of the vehicle 100 relative to the known landmarks and refine the determination of the vehicle's location. Certain designs of this technology may be included in a localization technology such as a mapping and routing model.

The map database 204 may include any suitable type of database storing (digital) map data for the vehicle 100, for the safety system 200. The map database 204 may include data relating to the position, in a reference coordinate system, of various items, including roads, water features, geographic features, businesses, points of interest, restaurants, gas stations, etc., as well as parameters of such items, such as road width, grade, slope, elevation, or the like. The map database 204 may store not only the locations of such items, but also descriptors relating to those features, including names associated with any of the stored features. A processor of the one or more processors 102 may access information from the map database 204 using a wired or wireless data connection, and/or may download information from an external map database 362 (FIG. 3B) over a wired or wireless data connection (such as over a cellular network and/or the Internet, etc.). The map database 204 may also include stored representations of various recognized landmarks that may be provided to determine or update a known position of the vehicle 100 with respect to a target trajectory. The landmark representations may include data fields such as landmark type, landmark location, among other potential identifiers. Landmarks may include road features such as lane markings, road edge markings, crosswalk markings, road arrow markings, stop line markings, or other road markers as would be understood by one of ordinary skill in the art. The road features may additionally or alternatively include traffic signs, traffic lights, or other traffic control elements, and/or utility or other poles (e.g. road light poles) or structures as would be understood by one of ordinary skill in the art.

In some cases, the map database 204 may store a sparse data model including polynomial representations of certain road features (such as road markings) or target trajectories for the vehicle 100. The map database 204 can also include non-semantic features including point clouds of certain objects or features in the environment, and feature point and descriptors. The map database 204 may also include road/infrastructure condition and/or quality data, such as identified or potential hazardous instances (e.g. potholes; impaired, stopped, or crashed vehicles; debris in the roadway; construction events; weather impairments (flooding, mudslide, washed-out road), or other obstructions or hazards as would be understood by one of ordinary skill in the art. The map database 204 may be dynamically updated (e.g. by the database provider, vehicle manufacture, or the like) to include changes to the map data. Additionally or alternatively, the map database 204 (and/or map database 362) may be dynamically updated in response to data driver submissions of new map data and/or driver submitted revisions to existing map data. As discussed in more detail below with reference to FIG. 3B, the map database 362 may additionally or alternatively be dynamically updated based on data provided from one or more vehicles 100, where updated map data may then be provided to the vehicle(s) 100.

Furthermore, the safety system 200 may implement the aforementioned SDM as part of any suitable type of control system, which may form part of an advanced driving assistance system (ADAS) or a driving assistance and automated driving system. The safety system 200 may include a computer implementation of a formal model such as the SDM. As described above, the vehicle 100 may include the safety system 200 as also described with reference to FIG. 2. The vehicle 100 may include the one or more processors 102, which may be integrated with or separate from an engine control unit (ECU) of the vehicle 100. The safety system 200 may generate data to control or assist to control the ECU and/or other components of the vehicle 100 to directly or indirectly control the driving of the vehicle 100. General Operation of the Vehicle 100 and Driver Scoring Controller 300

Figure 3A:
FIG. 3A illustrates a driver scoring controller in accordance with the present disclosure.
Figure 3A:
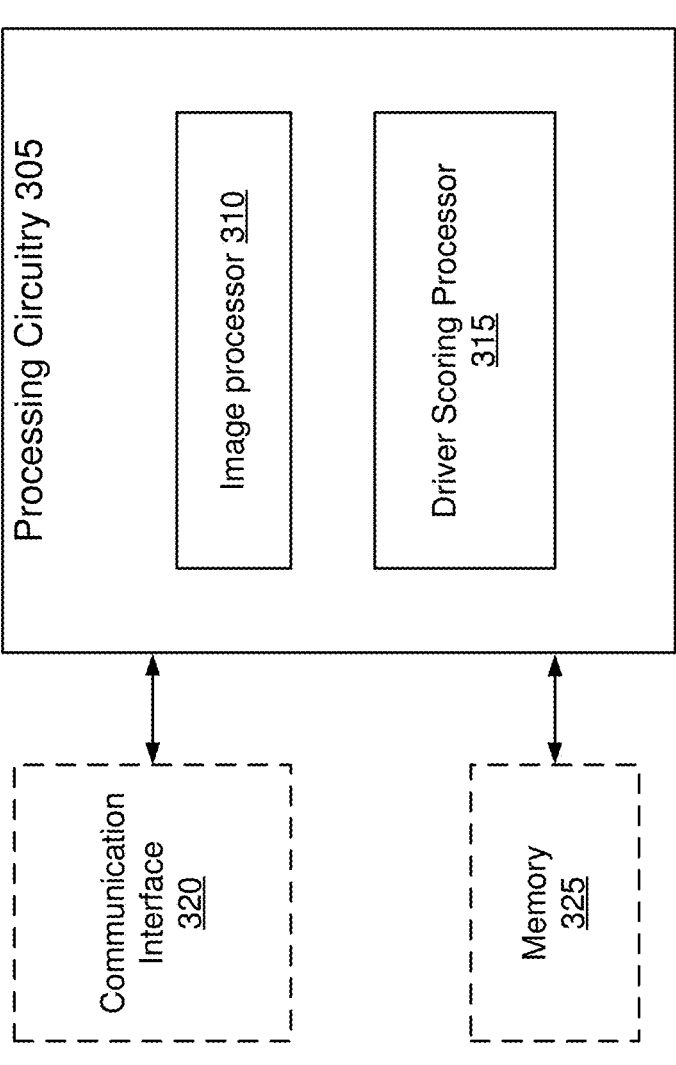

A driver scoring controller 300 of a vehicle is provided. With reference to FIG. 3A, the controller 300 may include processing circuitry 305. The controller 300 may optionally include a communication interface 320 and/or memory 325. The controller 300 may be implemented as one or more processor 102 of the vehicle 200.

Figure 3B:
FIG. 3B illustrates a road management system in accordance with the present disclosure.
Figure 3B:
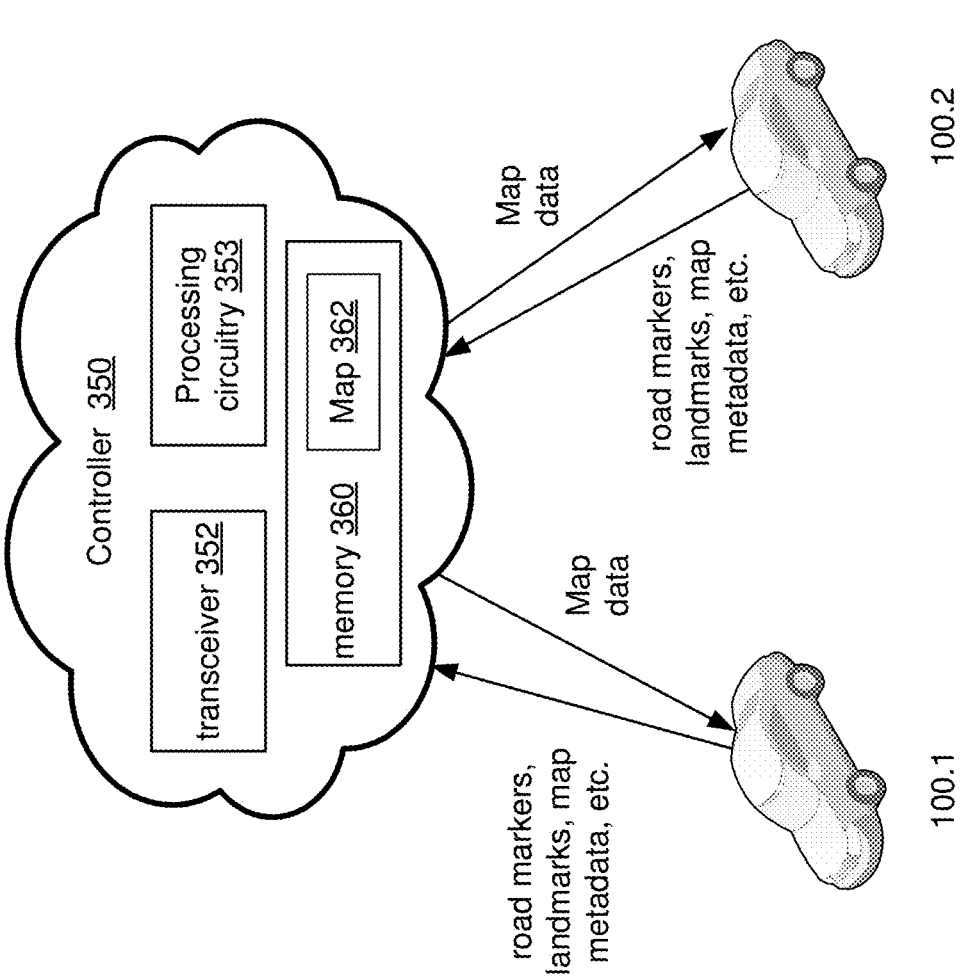

The controller 300 (e.g. via communication interface 320) is configured to receive map data from map database 204 (FIG. 2) and/or from one or more external sources outside the vehicle using one or more communication protocols (e.g. 5G, vehicle-to-everything (V2X) communication protocol), such as map data from controller 350 (FIG. 3B). The controller 300 may receive data from one or more sensors, such as image sensors 104, data from one or more mobile device sensors, and/or other sensor(s).

The memory 325 may store map data, road condition data, event data, driver score data, sensor data, and/or other data as would be understood by one of ordinary skill in the art. The memory 325 may additionally or alternatively store instructions that when executed by the processing circuitry 305, cause the processing circuitry 305 to perform one or more functions of the controller 300.

The processing circuitry 305 is configured to process data (e.g. map data and/or sensor data) received by the controller 300 and/or accessed from memory 325 to determine a driver score. The processing circuitry 305 may additionally or alternatively process the data (e.g. sensor data) to determine one or more event instances represented as event data. The processing of the data (e.g. map and/or sensor data) provides an increased detail and advanced driving characterization to improve upon conventional scoring techniques.

The processing circuitry 305 is configured to determine a driver score based on, for example, deviations between the map data and sensor data, such as positional deviations from a reference point and one or more landmarks, road markings, traffic signs, or other road features.

Additionally or alternatively, the driving system (e.g. safety system 200 and/or road management system 301) may be evaluated and adapted based on the driver scoring metrics determined using deviations between the optimum path (e.g. deviations between the map data and sensor data). The driving systems may be adaptively improved (e.g. using machine learning) based on determinations of deviations used in the driving scoring according to the disclosure.

Figure 4:
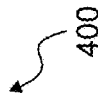
FIG. 4 illustrates example landmarks of a driving path in according with the present disclosure.

As illustrated in FIG. 4, landmarks may include road features such as lane markings 402, road edge markings 404, road arrow markings 406, stop line markings 410, crosswalk markings, or other road markers as would be understood by one of ordinary skill in the art. The road features may additionally or alternatively include signage, such as traffic lights 408, traffic signs 412, 414, 416, or other traffic control elements, and/or utility or other poles (e.g. road light poles) or structures as would be understood by one of ordinary skill in the art.

As described in more detail with reference to FIGS. 5A-7, the positions of the various landmarks with respect to a reference point is used to determine deviations from the optimum driving path 420. Advantageously, by using the deviations between the map data that includes an optimum drivable path 420 and the current position/path of the vehicle determined from sensor data, the processing circuitry 305 is configured to determine dynamic movements of the vehicle and the associated data leading up to an event and/or following an event. For example, using one or more landmarks, the processing circuitry 305 is configured to detect driving deviations from a desired (e.g. optimum) driving path 420, such as an optimum path for an autonomous vehicle. The processing circuitry 305 may process deviations between the map data that includes an optimum drivable path 420 and the current position/path of the vehicle determined from sensor data alert/event data, vector data, vector differences, landmark data, and/or other data using one or more machine learning models.

The processing circuitry 305 of the controller 300 may include an image processor 310 and a driver scoring processor 315. According to the disclosure, the image processor 310 is configured to process image data, such as one or more images, videos, and/or video frames, to determine deviations between image data generated by one or more vehicle sensors (e.g. from image sensor(s) 104) and the map data, where the map data includes one or more road features or landmarks identified in the image data.

Figure 7:
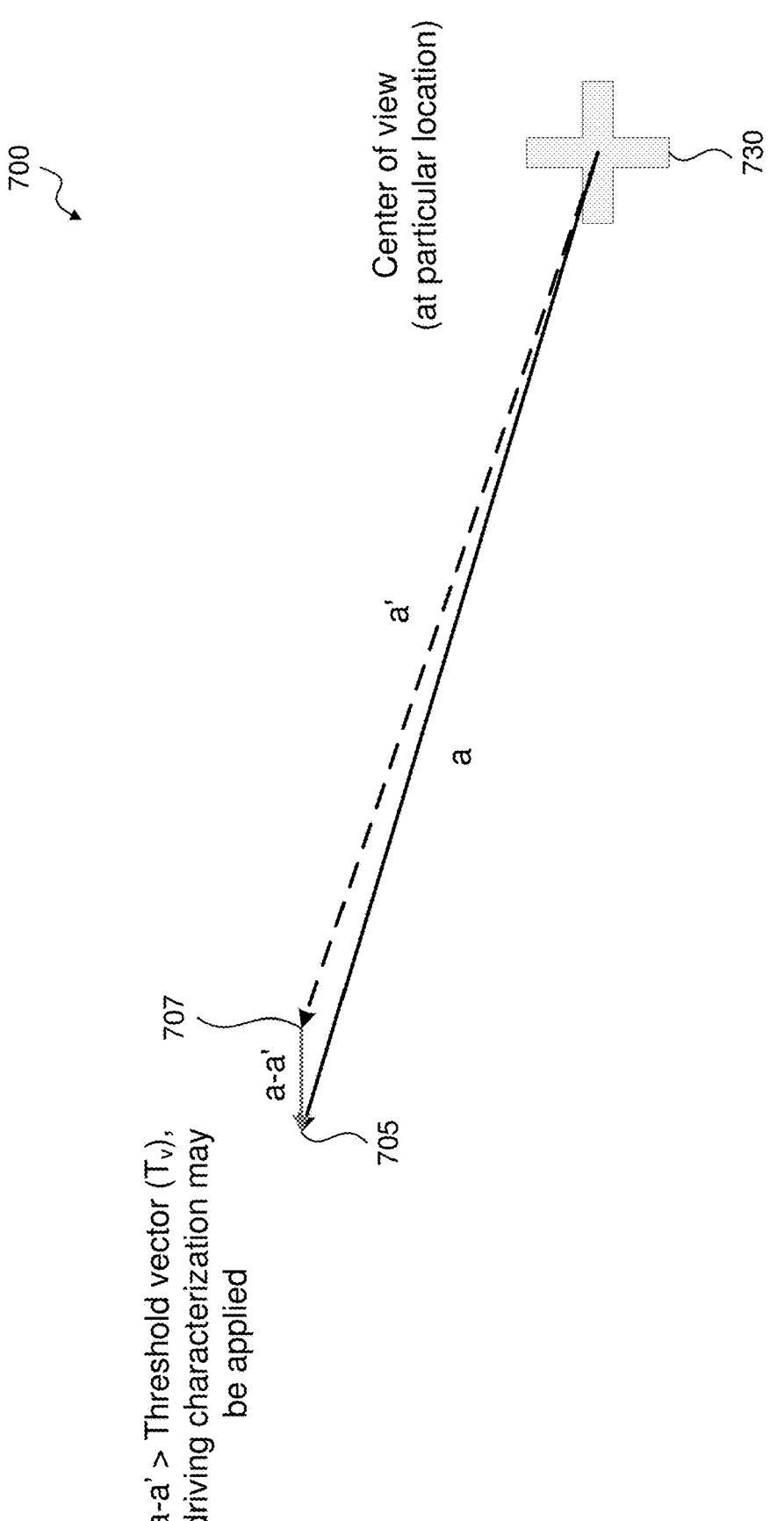
FIG. 7 illustrates position vectors and vector difference calculation in accordance with the present disclosure.

With reference to FIG. 7, the processing circuitry 305 (e.g. image processor 310) may be configured to process image data generated by one or more sensors of the vehicle (e.g. image sensor 104) at the vehicle's current position to determine one or more vectors (a') between a reference point 730 and one or more landmarks 707. The vector (a') is a position vector defining a position of the landmark 707 with respect the reference point 730 at the vehicles current position. The processing circuitry 305 may also be configured to determine one or more reference vectors (a) between the reference point 730 and the corresponding landmark(s) 705 when the vehicle is traversing an optimum path (e.g. the path used to direct an autonomous vehicle). The reference vector (a) is also a position vector defining a position of the landmark 707 with respect the reference point 730, but with respect to an optimum path. The reference vector (a) may be determined based on map data, such as map data from map database 204 and/or map database 362. The processing circuitry 305 may then determine a difference between the position vectors a and a' (e.g. a-a'), and compare the difference with a vector threshold Tr. The reference point 730 may be a center of view, such as a center of view of an image sensor such that the reference point 730 is the center of the captured image. In this example, the position of the reference point 730 with respect to the landmarks 707 changes as the vehicle is moving.

Figure 8A:
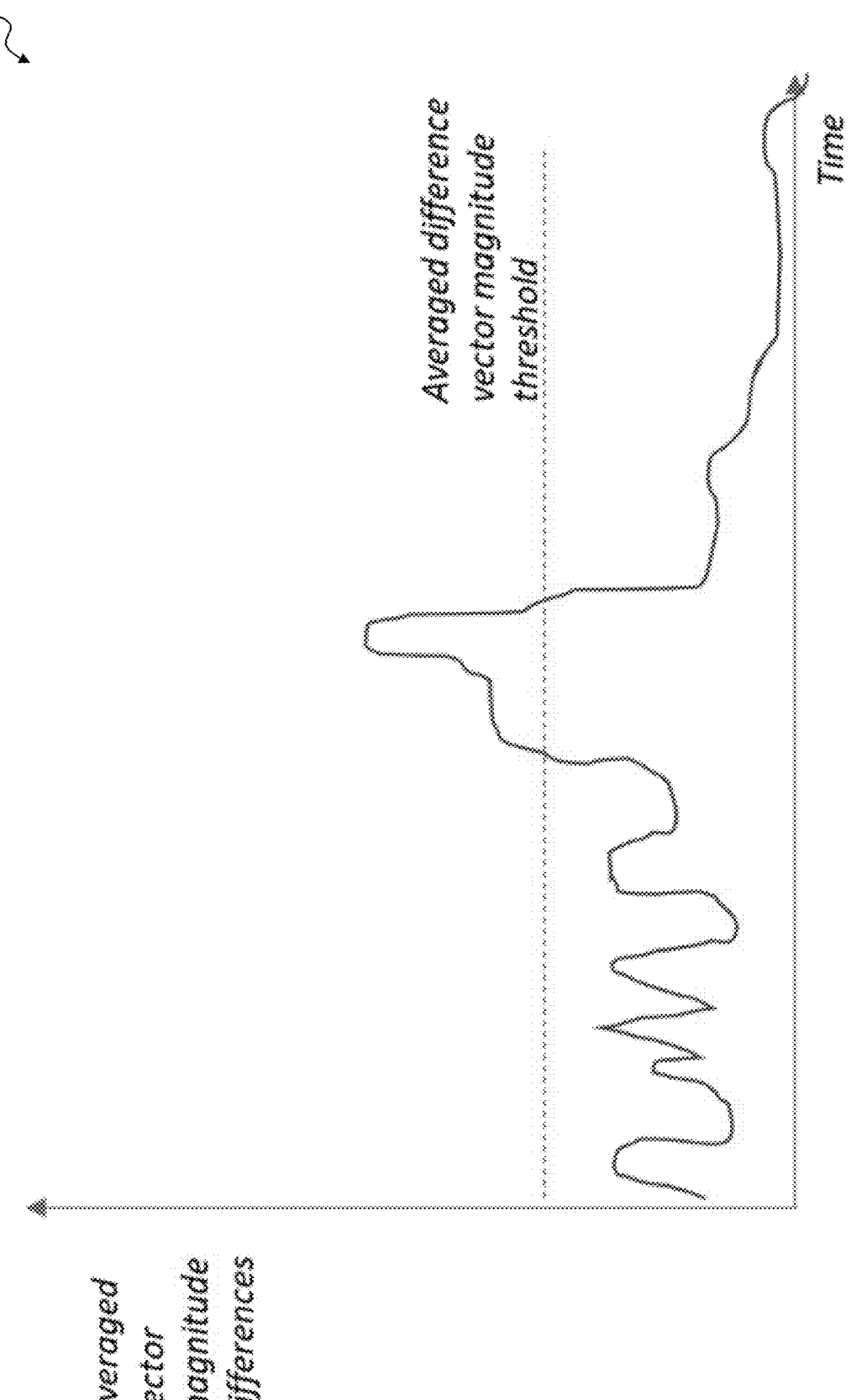
FIG. 8A illustrates a plot of an averaged vector magnitude differences in accordance with the present disclosure.
Figure 8B:
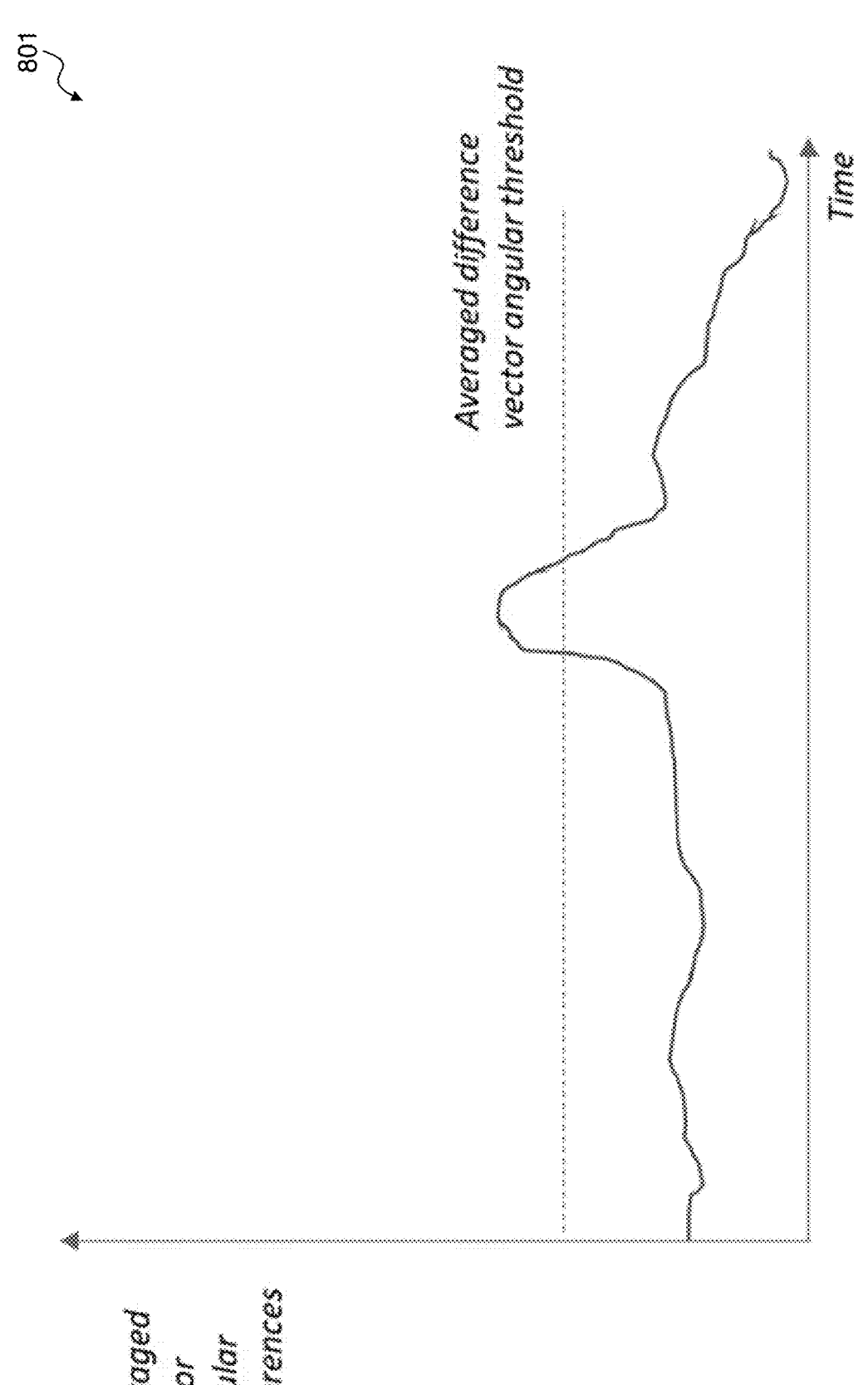
FIG. 8B illustrates a plot of an averaged vector angular differences in accordance with the present disclosure.

The processing circuitry 305 may be configured to determine a running windowed average (averaged over a sequence of video frames) of vector differences (greater than vector thresholds) for one or more landmarks over the path of the vehicle as illustrated in FIGS. 8A-8B, which illustrate the averaged vector magnitude differences and the averaged vector angular differences, respectively. Instances of a high deviation count and the extent of deviation or curve analysis of this windowed deviation can be used for driving characterization.

Figure 5A:
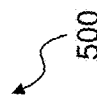
FIG. 5A illustrates position vectors and associated landmarks in accordance with the present disclosure.
Figure 5B:
FIG. 5B illustrates reference position vectors and associated landmarks in accordance with the present disclosure.

FIGS. 5A-5B illustrate the identification of one or more landmarks and the determination of position vectors between the identified landmarks and a reference point, center of view 530. Although examples include the center of view 530 as the reference point, the reference point is not limited thereto.

The controller 300 may be configured to process image data generated by one or more sensors of the vehicle (e.g. image sensor 104) at the vehicle's current position to identify one or more landmarks, such as lane markings 502, road edge markings 504, road arrow markings 506, stop line markings 510, crosswalk markings, traffic lights 508, traffic signs 512, 514, 516, or other markings or objects as would be understood by one of ordinary skill in the art. The controller 300 may then determine one or more position vectors (a') between the reference point 530 (as the center of view) and the identified landmarks. In the example illustrated in FIGS. 5A-5B, position vectors and vector differences are determine between traffic lights 508.1 and 508.2. For example, position vector a' is determined between the reference point 530 and traffic light 508.1 and position vector b' is determined between the reference point 530 and traffic light 508.2.

The controller 300 may then determine vector differences for the landmarks (traffic lights 508.1 and 508.2) based on the determined position vectors and position vectors for these landmarks during the traversal of an optimum path 520. FIG. 5B illustrates the position vectors between the landmarks, including position vector a between the reference point 530 and traffic light 508.1 and position vector b between the reference point 530 and traffic light 508.2. These optimum path position vectors may be provided to the vehicle (e.g. from a road management system 301 as shown in FIG. 3B) in the form of, for example, map data, map metadata, and/or other data, and/or determined by the controller 300 of the vehicle 100 based on data provided to the vehicle (e.g. from a road management system 301). In configurations where the controller 300 determines the optimum path vectors, the controller 300 can be provided the optimum path 520 and then determines the position vectors for the landmarks with respect to the reference point 530 when adjusted to the optimum path 520.

The controller 300 may then determine vector difference a-a' for traffic light 508.1 and vector difference b-b' for traffic light 508.2. The controller 300 may then determine a driver score or driving characterization based on one or more of the vector differences and corresponding vector threshold values. The vector difference for a particular landmark may be determined continuously (e.g. while the landmark is within a viewing range of the image sensor 104) and two or more of the calculated vector differences for the particular landmark may be used in the driver scoring and/or characterization. For example, an average or a rolling average of the vector differences may be determined and compared to the threshold value.

For configurations when vector differences for two or more landmarks are determined, the controller 300 may use one or more vector differences from one or more of the landmarks in the driver scoring and/or characterization. The number of vector differences and/or the number of associated landmarks may be dynamically adjusted, such as to adjust the degree of accuracy of the driver scoring and/or characterization calculations. The adjustments may be based on the number of events/alerts determined by the vehicle 100 within a particular driving segment or time window, a previous driver score determined by the controller 300, available processing capabilities of the controller 300 or vehicle 100, and/or one or more other factors or parameters as would be understood by one of ordinary skill in the art.

Figure 6A:
FIG. 6A illustrates position vectors and associated landmarks in accordance with the present disclosure.
Figure 6B:
FIG. 6B illustrates reference position vectors and associated landmarks in accordance with the present disclosure.

FIGS. 6A-6B illustrate the identification of one or more landmarks and the determination of position vectors between the identified landmarks and a reference point, center of view 630, similar to the identification and determinations as discussed with reference to FIGS. 5A-5B. In FIGS. 6A-6B, the determination of the position vectors and vector differences utilizes only landmarks in the form of various lane markings, such as lane markings 602, road edge markings 604, and road arrow markings 606. For example, position vectors are determined between the center of view 630 as the reference point and road arrow 606.1, road arrow 606.2, and road edge 604.1, as position vectors k, m, and n, respectively.

Figure 9:
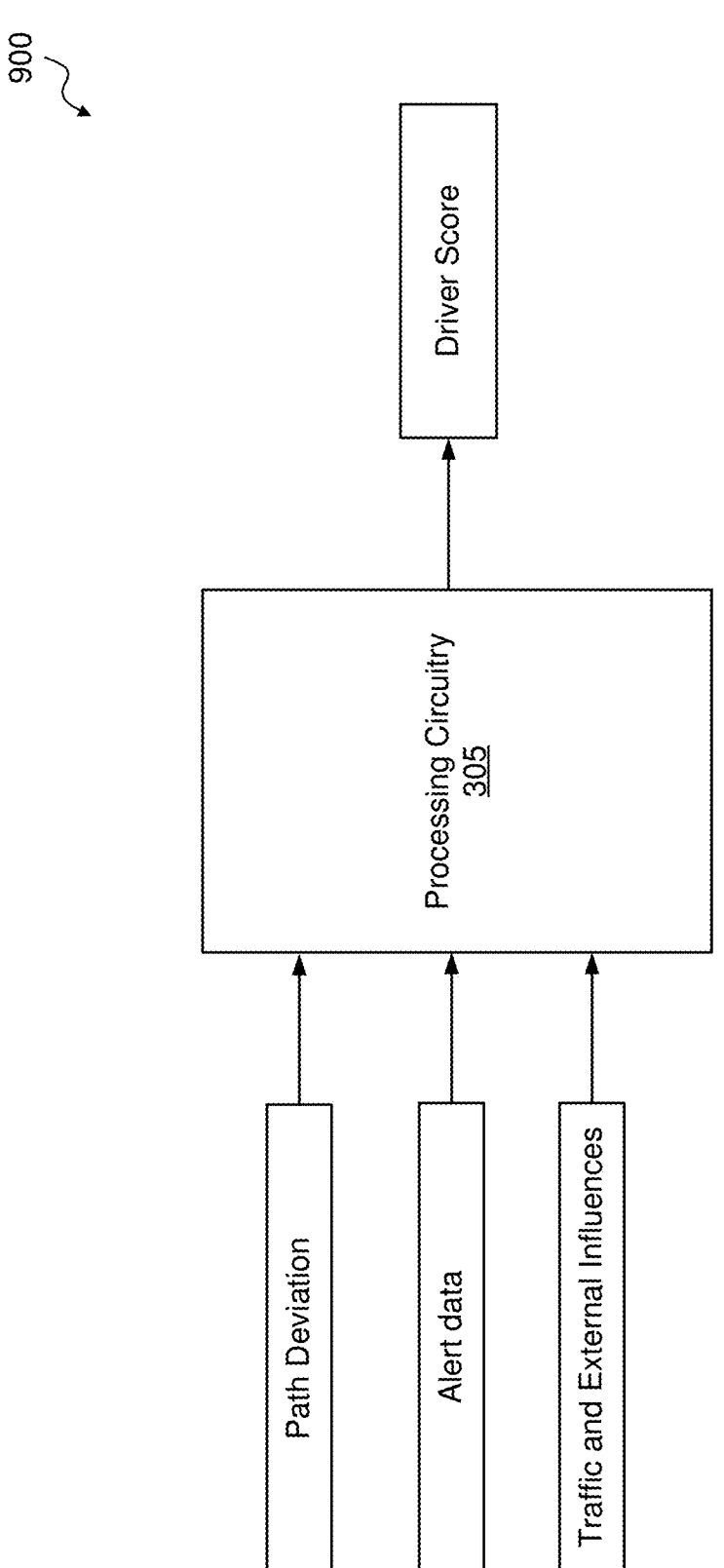
FIG. 9 illustrates a driver score calculation in accordance with the present disclosure.

The controller 300 may be configured to determine one or more driver scores and/or characterizations of a vehicle's movements or behaviors based on determined deviations from an optimum path (based on landmark vector differences), one or more alerts/events, traffic data, sensor data, map data, map metadata, map markers, and/or other data as would be understood by one of ordinary skill in the art. As shown in FIG. 9, the processing circuitry 305 of the controller 300 may generate the driver score based on the path deviations, alert data (corresponding to one or more events/alerts), and/or traffic data and other external influences. The driver score may be alternatively or additional determined based on one or more other data parameters as would be understood by one of ordinary skill in the arts.

Additionally, or alternatively, the controller 300 may be configured to determine and analyze deviation at a regular sampling frequency with respect to distance, time and/or significant location points (intersections, grey spots, etc.). Based on the comparison of the deviations with the threshold value, the deviations may contribute the driver score calculation or disregarded. Additionally, or alternatively, the controller 300 may adjust the sampling of the sensor data and/or map data (or other data) based on the degree and/or prevalence of the deviations and/or in response to a generated event/alert. For example, if a Headway Monitoring Warning (HMW) event is generated (which may imply tailgating), the frequency of sampling of optimum path deviations may be increased. As a further example, if a lane departure warning is generated, the optimum path deviation information may be ignored as the deviation may be intended by the driver. Additionally, or alternatively, the nature of the road and/or traffic may also impact the use of the path deviations as a deviation may be the result of the driver attempting to avoid traffic.

As discussed above, the determination of driver scores may be computed externally, such as by the system 301, and/or by the vehicle's internal system (e.g. controller 300). For example, non-autonomous vehicles may upload the data to the external system 301 where driver scores can be computed. In configuration where the computations are performed by the vehicle 100, the vehicle 100 can download the map from the system 301, determine path deviations, and generate the driver score based on the deviations.

Figure 10:
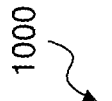
FIG. 10 illustrates a driver score calculation in accordance with the present disclosure.

As illustrated in FIG. 10, optimum path deviations for driving characterization can be used to generate the driver score based on the vector magnitude and angular deviations. Accumulated, distance normalized, magnitude and/or angular data sampled at location points over the course of a trip can be used to derive a score using, for example, the histogram-CDF (cumulative distribution function) or other distribution functions as would be understood by one of ordinary skill in the art.

General Operation of the Vehicle 100 and Road Management System 301

Maps for vehicle positioning may be created by crowd sourcing data associated with the various landmarks. FIG. 3B shows system 301 having controller 350 that is configured to communicate with one or more vehicles 100 via one or more communication technologies (e.g. 5G). The controller 350 may include a transceiver 352, processing circuitry 353, and memory 360 having a map database 362.

The transceiver 352 may be configured to operate in accordance with any suitable number and/or type of desired radio communication protocols or standards, such as one or more Short Range mobile radio communication standards (e.g. Bluetooth, Zigbee, and the like); one or more Medium or Wide Range mobile radio communication standard (e.g. 3G (Universal Mobile Telecommunications System-UMTS), a 4G (Long Term Evolution-LTE), or a 5G mobile radio communication standard in accordance with corresponding 3GPP (3rd Generation Partnership Project) standards, the most recent version at the time of this writing being the 3GPP Release 16 (2020); one or more a Wireless Local Area Network communication protocols or standards (e.g. one or more technologies in accordance with IEEE 802.11 Working Group Standards) and/or one or more vehicle to everything (V2X) communication protocols).

The processing circuitry 353 may be configured to analyze and/or process data, such as data received from one or more vehicles, to generate and/or modify one or more maps. The generated and/or updated maps may be stored in map database 362 and/or provided to one or more vehicles via the transceiver 352. Additionally, or alternatively, the processing circuitry 353 may be configured to determine one or more driver scores based on map data and/or other data (e.g. vector data, vector differences) from one or more vehicles 100. The determination of vector differences may be determined by the controller 350 alone or in cooperation with the controller 300 of one or more vehicles 100. That is, the controller 300 of the vehicle and/or the controller 350 may determine a driver score based on deviations between the map data and sensor data, such as positional deviations from a reference point and one or more landmarks, road markings, traffic signs, or other road features.

Additionally, or alternatively, the processing circuitry 353 may be configured to generate control data to control one or more vehicles 100 to perform one or more actions; analyze and/or process alert/event data corresponding to one or more vehicle-generated alerts/events; generate one or more alerts based on sensor data; imaging, video, and/or audio processing; object detection processing; and/or other processing as would be understood by one of ordinary skill in the art. The operations performed by the processing circuitry 353 may be in collaboration with operations performed by the vehicle(s) 100, such as to cooperatively perform one or more of the methods of the disclosure. The alert/event data, vector data, vector differences, and/or other data may be combined with low confidence map data (e.g. map metadata) to generate one or more higher-confidence maps. The improved/updated maps may then be provided to the vehicle(s) 100 via the transceiver 352. The processing circuitry 353 may process alert/event data, vector data, vector differences, and/or other data using one or more machine learning models.

Method for Optimum Path Deviation Driving Scoring

Figure 11:
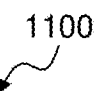
FIG. 11 illustrates a flowchart of a driver scoring method in accordance with the present disclosure.
Figure 11:
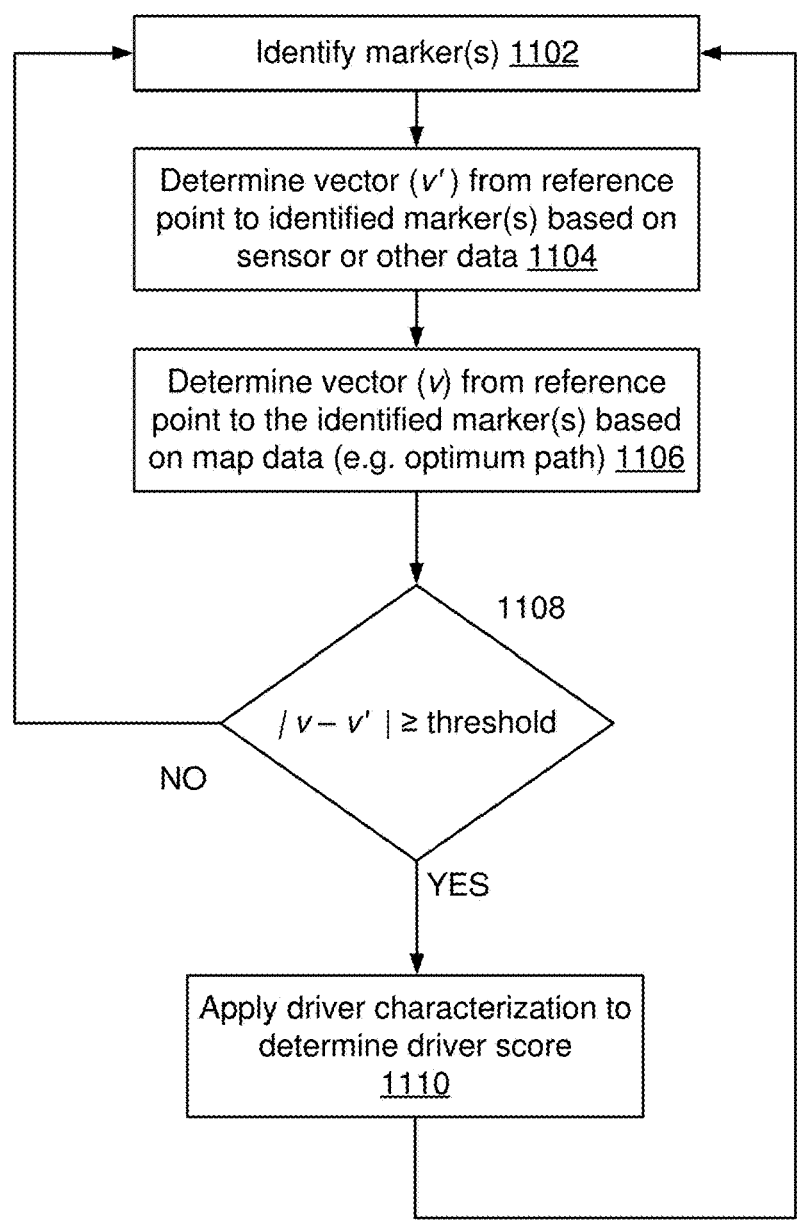

FIG. 11 illustrates a flowchart of a driver scoring method 1100 according to the disclosure. The flowchart 1100 is described with continued reference to FIGS. 1-10. The operations of the method are not limited to the order described below, and the various operations may be performed in a different order. Further, two or more operations of the methods may be performed simultaneously with each other.

The flowchart 1100 begins with operations 1102, where one or more landmarks are identified. For example, the controller 300 may process image data generated by one or more sensors of the vehicle (e.g. image sensor 104) to identify one or more landmarks (e.g. as illustrated in FIG. 4, such as lane markings 402, road edge markings 404, road arrow markings 406, stop line markings 410, crosswalk markings, traffic lights 408, traffic signs 412, 414, 416, or other markings or objects as would be understood by one of ordinary skill in the art).

After operation 1102, the flowchart 1100 transitions to operation 1104, where one or more position vectors (v') from the reference point to the identified marker(s) are determined based on sensor or other data. For example, the controller 300 may be configured to determine one or more position vectors (v') between the reference point (e.g. center of view 530) and the identified landmarks based on the vehicle's current position and image data including the landmark(s).

After operation 1104, the flowchart 1100 transitions to operation 1106, where one or more position vectors (v) from the reference point to the identified marker(s) are determined based on map data. In this example, the position vectors (v) corresponding to position vectors between the reference point and the landmarks during a traversal of an optimum path (e.g. path 520) by a vehicle. This optimum path is a path that is traversed by an autonomous vehicle when under an autonomous or semi-autonomous operation, such as the path determined by an advanced driving assistance system (ADAS) or a driving assistance and automated driving system. The vehicle may be provided the information defining the optimum path by its ADAS or other driving system, and/or by one or more external systems in the form of, for example, map data (e.g. map data provided by controller 350). For example, the optimum path position vectors may be provided to the vehicle from a road management system 301 as shown in FIG. 3B.

After operation 1106, the flowchart 1100 transitions to operation 1108, where one or more vector differences are determined and the vector differences are compared to a threshold value. For example, the controller 300 may determine vector differences for the landmarks based on the determined position vectors (v') and position vectors (v) for these landmarks during the traversal of an optimum path. The controller 300 may then compare the vector difference to a threshold value to determine if the deviation from the optimum path as reflected by the vector difference should be used for driving characterization and/or be used in the driver scoring determination.

The determination of the position vectors and/or vector differences may be determined locally by the vehicle (e.g. by controller 300), by one or more external systems (e.g. by controller 350), and by a combination of local and external processing. In configurations where an external system performs at least some determinations of the position vectors and/or vector differences, the vehicle can provide data identifying the landmarks at the vehicles current position to the external system.

In configurations where the controller 300 determines the optimum path position vectors, the controller 300 can be provided the optimum path 520 and then determines the position vectors for the landmarks with respect to the reference point 530 when adjusted to the optimum path 520.

If the comparison of the vector difference is greater than or equal to the threshold (YES at operation 1108), the flowchart 1100 transitions to operation 1110 where the vector differences are used for driving characterization and/or as a factor in driver score determinations. Otherwise (NO at operation 1108), the flowchart 1100 returns to operation 1102. For example, the controller 300 may determine the driver score based on the vector difference. Additionally, or alternatively, the external controller 350 may determine the driver score based on the vector difference. The vector difference for a particular landmark may be determined continuously (e.g. while the landmark is within a viewing range of the image sensor 104) and two or more of the calculated vector differences for the particular landmark may be used in the driver scoring and/or characterization. For example, an average or a rolling average of the vector differences may be determined and compared to the threshold value.

With continued reference to FIG. 11, the flowchart 1100 may be a computer-implemented method executed by and/or otherwise associated with one or more processors (processing circuitry) and/or storage devices. These processors and/or storage devices may be, for instance, associated with one or more components of a vehicle 100 as discussed herein with reference to FIG. 1, including the controller 300 of FIG. 3A and/or controller 350 of FIG. 3B. For instance, the processors and/or storage devices may be identified with the one or more processors 102 and/or one or more of the application processors 214A, 214B, image processor 216, communication processor 218, etc., executing computer-readable instructions stored in the memory 202, as shown and described herein with reference to FIG. 2. The one or more processors 102 and/or one or more of the application processors 214A, 214B, image processor 216, communication processor 218, etc. may additionally or alternatively work exclusively as hardware components (processing circuitry or other suitable circuitry), execute instructions stored on other computer-readable storage mediums not shown in the Figures (which may be locally-stored instructions as part of the processing circuitries themselves), and any combination thereof. The various vehicle components used to perform the method 1100 may also include other components such as one or more of the wireless transceivers 208, 210, 212, and their accompanying communication interface(s), as discussed herein with reference to FIG. 2. The flowchart 1100 may include alternate or additional steps that are not shown in FIG. 11, for purposes of brevity, and may be performed in a different order than the steps shown.

EXAMPLES

The following examples pertain to various techniques of the present disclosure.

An example (e.g. example 1) relates to a controller of a vehicle, comprising: a communication interface configured to receive map data and sensor data; and processing circuitry configured to: determine a positional deviation between one or more landmarks included in the map data and the one or more landmarks included in the sensor data; and determine a driver score based on the determined positional deviation.

Another example (e.g. example 2) relates to a previously-described example (e.g. example 1), wherein the positional deviation is a deviation of the vehicle from an ideal position of an autonomous vehicle determined based on the map data.

Another example (e.g. example 3) relates to a controller of a vehicle, comprising: a communication interface configured to receive map data and sensor data; and processing circuitry configured to: determine a deviation between the map data and the sensor data; and determine a driver score based on the determined deviation between the map data and the sensor data.

Another example (e.g. example 4) relates to a previously-described example (e.g. example 3), wherein the processing circuitry is configured to determine a positional deviation between one or more landmarks included in the map data and the one or more landmarks included in the sensor data.

Another example (e.g. example 5) relates to a previously-described example (e.g. example 3), wherein the deviation is a positional deviation between one or more landmarks included in the map data and the one or more landmarks included in the sensor data.

Another example (e.g. example 6) relates to a previously-described example (e.g. one or more of examples 1-5), wherein the deviation is a positional deviation of the vehicle from an ideal position of an autonomous vehicle determined based on the map data.

Another example (e.g. example 7) relates to a previously-described example (e.g. one or more of examples 1-6), wherein the map data comprises a reference position vector of a landmark, the processing circuitry being configured to: determine, based on the sensor data, a corresponding position vector position of the landmark; and determine a deviation between the reference position vector and the determined position vector position to determine the deviation between the map data and the sensor data.

Another example (e.g. example 8) relates to a previously-described example (e.g. one or more of examples 1-7), wherein sensor data comprises one or more images, videos, or video frames captured by a camera of the vehicle.

Another example (e.g. example 9) relates to a previously-described example (e.g. one or more of examples 1-8), wherein the processor circuitry is configured to adjust a sampling of the sensor data based on one or more driving events to generate sampled sensor data, the driver score being based on a deviation between the map data and the sampled sensor data.

Another example (e.g. example 10) relates to a previously-described example (e.g. one or more of examples 1-9), wherein the processing circuitry is further configured to determine a driving event based on the sensor data, the driver score being determined based on the determined deviation and the driving event.

Another example (e.g. example 11) relates to a previously-described example (e.g. example 10), wherein the driving event comprises an acceleration event, a velocity event, a braking event, a directional-change event, a distracted-driver event, impaired-driver event, and/or a collision-avoidance event.

Another example (e.g. example 12) relates to a previously-described example (e.g. one or more of examples 10-11), wherein the sensor data is generated from a sensor of the vehicle and/or a sensor within or attached to the vehicle that is communicatively coupled to the controller.

Another example (e.g. example 13) relates to a previously-described example (e.g. one or more of examples 10-12), wherein the sensor data includes data from a mobile device within the vehicle.

Another example (e.g. example 14) relates to a previously-described example (e.g. one or more of examples 1-13), wherein the landmark comprises: a lane marking, a road edge, a road arrow, a stop line, a cross walk, a traffic sign or light, or utility pole.

Another example (e.g. example 15) relates to a previously-described example (e.g. one or more of examples 1-14), wherein the map data is usable to determine an optimum path of an autonomous vehicle.

Another example (e.g. example 16) relates to a previously-described example (e.g. one or more of examples 1-15), wherein the driver score is determined based further on map metadata.

Another example (e.g. example 17) relates to a controller of a vehicle, comprising: a communication interface configured to receive sensor data; and processing circuitry configured to: determine a landmark associated with a drivable path based on the sensor data; and determine a driver score based on a position vector of the identified landmark and a reference position vector of the landmark.

Another example (e.g. example 18) relates to a previously-described example (e.g. example 17), wherein the controller is configured to determine the position vector of the landmark with respect to a current position of the vehicle on the drivable path.

Another example (e.g. example 19) relates to a previously-described example (e.g. one or more of examples 17-18), wherein the reference position vector is determined with respect to an optimum drivable path.

Another example (e.g. example 20) relates to a previously-described example (e.g. one or more of examples 17-19), wherein the controller is configured to determine a difference between the position vector and the reference position vector, the driver score being determined based on the determined difference.

Another example (e.g. example 21) relates to a previously-described example (e.g. example 20), wherein the difference between the position vector and the reference position vector reflect a deviation of the vehicle from an optimum drivable path.

Another example (e.g. example 22) relates to a previously-described example (e.g. one or more of examples 20-21), wherein the controller is configured to compare the determined difference with a threshold value, the driver score being determined based on the comparison.

Another example (e.g. example 23) relates to a previously-described example (e.g. one or more of examples 20-22), wherein the communication interface is further configured to receive the reference position vector of the landmark.

Another example (e.g. example 24) relates to a previously-described example (e.g. one or more of examples 17-23), wherein the controller is configured to determine the reference position vector based on map data.

Another example (e.g. example 25) relates to a previously-described example (e.g. one or more of examples 17-24), wherein the communication interface is further configured to receive the map data.

Another example (e.g. example 26) relates to controller of a vehicle, comprising: interface means for receiving sensor data; and processing means for: determining a landmark associated with a drivable path based on the sensor data; and determining a driver score based on a position vector of the identified landmark and a reference position vector of the landmark.

Another example (e.g. example 27) relates to a previously-described example (e.g. example 26), wherein the position vector of the landmark is determined with respect to a current position of the vehicle on the drivable path.

Another example (e.g. example 28) relates to a previously-described example (e.g. one or more of examples 26-27), wherein the reference position vector is determined with respect to an optimum drivable path.

Another example (e.g. example 29) relates to a previously-described example (e.g. one or more of examples 26-28), wherein the processing means is configured to determine a difference between the position vector and the reference position vector, the driver score being determined based on the determined difference.

Another example (e.g. example 30) relates to a previously-described example (e.g. example 29), wherein the difference between the position vector and the reference position vector reflect a deviation of the vehicle from an optimum drivable path.

Another example (e.g. example 31) relates to a previously-described example (e.g. one or more of examples 26-30), wherein the processing means is configured to determine the position vector of the landmark with respect to a current position of the vehicle on the drivable path.

Another example (e.g. example 32) relates to a previously-described example (e.g. one or more of examples 26-31), wherein the interface means is further configured to receive the reference position vector of the landmark.

Another example (e.g. example 33) relates to a previously-described example (e.g. one or more of examples 26-32), wherein the processing means is configured to determine the reference position vector based on map data.

Another example (e.g. example 34) relates to a previously-described example (e.g. one or more of examples 26-33), wherein the interface means is further configured to receive the map data.

Another example (e.g. example 35) relates to a controller of a vehicle, comprising: interface means for receiving map data and sensor data; and processing means for: determining a positional deviation between one or more landmarks included in the map data and the one or more landmarks included in the sensor data; and determining a driver score based on the determined positional deviation.

Another example (e.g. example 36) relates to a previously-described example (e.g. example 35), wherein the positional deviation is a deviation of the vehicle from an ideal position of an autonomous vehicle determined based on the map data.

Another example (e.g. example 37) relates to a previously-described example (e.g. one or more of examples 35-36), wherein the map data comprises a reference position vector of a landmark, the processing means being further for: determining, based on the sensor data, a corresponding position vector position of the landmark; and determining a deviation between the reference position vector and the determined position vector position to determine the deviation between the map data and the sensor data.

Another example (e.g. example 38) relates to a previously-described example (e.g. one or more of examples 35-37), wherein sensor data comprises one or more images, videos, or video frames captured by a camera of the vehicle.

Another example (e.g. example 39) relates to a previously-described example (e.g. one or more of examples 35-38), wherein the processor means is further for adjusting a sampling of the sensor data based on one or more driving events to generate sampled sensor data, the driver score being based on a deviation between the map data and the sampled sensor data.

Another example (e.g. example 40) relates to a previously-described example (e.g. one or more of examples 35-39), wherein the processing means is further for determining a driving event based on the sensor data, the driver score being determined based on the determined deviation and the driving event.

Another example (e.g. example 41) relates to a previously-described example (e.g. example 40), wherein the driving event comprises an acceleration event, a velocity event, a braking event, a directional-change event, a distracted-driver event, impaired-driver event, and/or a collision-avoidance event.

Another example (e.g. example 42) relates to a previously-described example (e.g. one or more of examples 40-41), wherein the sensor data is generated from a sensor of the vehicle and/or a sensor within or attached to the vehicle that is communicatively coupled to the controller.

Another example (e.g. example 43) relates to a previously-described example (e.g. one or more of examples 40-42), wherein the sensor data includes data from a mobile device within the vehicle.

Another example (e.g. example 44) relates to a previously-described example (e.g. one or more of examples 35-43), wherein the landmark comprises: a lane marking, a road edge, a road arrow, a stop line, a cross walk, a traffic sign or light, or utility pole.

Another example (e.g. example 45) relates to a previously-described example (e.g. one or more of examples 35-44), wherein the map data is usable to determine an optimum path of an autonomous vehicle.

Another example (e.g. example 46) relates to a previously-described example (e.g. one or more of examples 35-45), wherein the driver score is determined based further on map metadata.

Another example (e.g. example 47) relates to vehicle that includes the controller of a previously-described example (e.g. one or more of examples 1-46).

Another example (e.g. example 48) relates to non-transitory computer-readable storage medium with an executable program stored thereon, that when executed, instructs a processor to: determine a positional deviation between one or more landmarks included in map data and the one or more landmarks included in sensor data; and determine a driver score based on the determined positional deviation.

Another example (e.g. example 49) relates to a previously-described example (e.g. example 48), wherein the map data comprises a reference position vector of a landmark, the execution of the program causing the processor to: determine, based on the sensor data, a corresponding position vector position of the landmark; and determine a deviation between the reference position vector and the determined position vector position to determine the deviation between the map data and the sensor data.

Another example (e.g. example 50) relates to a previously-described example (e.g. one or more of examples 48-49), wherein the execution of the program causing the processor to adjust a sampling of the sensor data based on one or more driving events to generate sampled sensor data, the driver score being based on a deviation between the map data and the sampled sensor data.

Another example (e.g. example 51) relates to a previously-described example (e.g. one or more of examples 48-50), wherein the execution of the program causing the processor to determine a driving event based on the sensor data, the driver score being determined based on the determined deviation and the driving event.

Another example (e.g. example 52) relates to non-transitory computer-readable storage medium with an executable program stored thereon, that when executed, instructs a processor to: determine a landmark associated with a drivable path based on the sensor data; and determine a driver score based on a position vector of the identified landmark and a reference position vector of the landmark.

Another example (e.g. example 53) relates to a previously-described example (e.g. example 52), wherein the execution of the program causing the processor to determine the position vector of the landmark with respect to a current position of the vehicle on the drivable path.

Another example (e.g. example 54) relates to a previously-described example (e.g. one or more of examples 52-53), wherein the reference position vector is determined with respect to an optimum drivable path.

Another example (e.g. example 55) relates to a previously-described example (e.g. one or more of examples 52-54), wherein the execution of the program causing the processor to determine a difference between the position vector and the reference position vector, the driver score being determined based on the determined difference.

Another example (e.g. example 56) relates to a previously-described example (e.g. one or more of examples 52-55), wherein the execution of the program causing the processor to determine the reference position vector based on map data.

Another example (e.g. example 57) relates to non-transitory computer-readable storage medium with an executable program stored thereon, that when executed, instructs a processor to perform a method as shown and described.

Another example (e.g. example 58) relates to an apparatus as shown and described.

Another example (e.g. example 59) relates a method as shown and described.

CONCLUSION

The aforementioned description will so fully reveal the general nature of the implementation of the disclosure that others can, by applying knowledge within the skill of the art, readily modify and/or adapt for various applications such specific implementations without undue experimentation and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Each implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The exemplary implementations described herein are provided for illustrative purposes, and are not limiting. Other implementations are possible, and modifications may be made to the exemplary implementations. Therefore, the specification is not meant to limit the disclosure. Rather, the scope of the disclosure is defined only in accordance with the following claims and their equivalents.

The designs of the disclosure may be implemented in hardware (e.g., circuits), firmware, software, or any combination thereof. Designs may also be implemented as instructions stored on a machine-readable medium, which may be read and executed by one or more processors. A machine-readable medium may include any mechanism for storing or transmitting information in a form readable by a machine (e.g., a computing device). A machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. The phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned data types and may take various forms and represent any information as understood in the art.

The terms "processor" or "controller" as used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

In one or more of the implementations described herein, processing circuitry can include memory that stores data and/or instructions. The memory can be any well-known volatile and/or non-volatile memory, including read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). A processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' via calculations a mathematical expression/formula/relationship and 'indirect' calculations via lookup or hash tables and other array indexing or searching operations.

A "vehicle" may be understood to include any type of driven object. A vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

The term "autonomous vehicle" may describe a vehicle that implements all or substantially all navigational changes, at least during some (significant) part (spatial or temporal, e.g., in certain areas, or when ambient conditions are fair, or on highways, or above or below a certain speed) of some drives. Sometimes an "autonomous vehicle" is distinguished from a "partially autonomous vehicle" or a "semi-autonomous vehicle" to indicate that the vehicle is capable of implementing some (but not all) navigational changes, possibly at certain times, under certain conditions, or in certain areas. A navigational change may describe or include a change in one or more of steering, braking, or acceleration/deceleration of the vehicle. A vehicle may be described as autonomous even in case the vehicle is not fully automatic (fully operational with driver or without driver input). Autonomous vehicles may include those vehicles that can operate under driver control during certain time periods and without driver control during other time periods. Autonomous vehicles may also include vehicles that control only some implementations of vehicle navigation, such as steering (e.g., to maintain a vehicle course between vehicle lane constraints) or some steering operations under certain circumstances (but not under all circumstances), but may leave other implementations of vehicle navigation to the driver (e.g., braking or braking under certain circumstances). Autonomous vehicles may also include vehicles that share the control of one or more implementations of vehicle navigation under certain circumstances (e.g., hands-on, such as responsive to a driver input) and vehicles that control one or more implementations of vehicle navigation under certain circumstances (e.g., hands-off, such as independent of driver input). Autonomous vehicles may also include vehicles that control one or more implementations of vehicle navigation under certain circumstances, such as under certain environmental conditions (e.g., spatial areas, roadway conditions). In some implementations, autonomous vehicles may handle some or all implementations of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (as defined by the SAE in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

The systems and methods of the disclosure may utilize one or more machine learning models to perform corresponding functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

The systems and methods of the disclosure may utilize one or more classification models. In a classification model, the outputs may be restricted to a limited set of values (e.g., one or more classes). The classification model may output a class for an input set of one or more input values. An input set may include road condition data, event data, sensor data, such as image data, radar data, LIDAR data and the like, and/or other data as would be understood by one of ordinary skill in the art. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

One or more regression models may be used. A regression model may output a numerical value from a continuous range based on an input set of one or more values. References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

As described herein, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing a vehicle to operate according to the manners described herein. Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

The invention claimed is:

1. A controller of a vehicle, comprising:
a communication interface configured to receive, at a sampling frequency, map data and sensor data, and
processing circuitry configured to, while navigating a driving environment:
determine a positional deviation between a landmark included in the map data and a landmark included in the sensor data by:
determining, based on the sensor data, a position vector between a reference point of the vehicle and the landmark included in the sensor data;
determining, based on the map data, a reference position vector between the reference point and the landmark included in the map data, the reference position vector being associated with an optimum path of the vehicle; and
calculating a vector difference between the position vector and the reference position vector to determine the positional deviation;
selectively adjusting the sampling frequency based upon the determined positional deviation;
determining, based upon a comparison of the determined positional deviation to a threshold value, whether to include the determined positional deviation as part of a driver score calculation; and
calculating a driver score, based on the determined positional deviation and a positive determination to include the determined positional deviation as part of the driver score calculation, to provide a continuous path monitoring to improve driver scoring accuracy, the driver score thereby quantifying a deviation of the vehicle from the optimum path.

2. The controller of claim 1, wherein the positional deviation is a deviation of the vehicle from an ideal position of an autonomous vehicle determined based on the map data.

3. The controller of claim 1, wherein the sensor data comprises one or more images, videos, or video frames captured by a camera of the vehicle.

4. The controller of claim 1, wherein the processing circuitry is configured to adjust the sampling frequency of the sensor data based on one or more driving events to generate sampled sensor data, the driver score being based on a deviation between the map data and the sampled sensor data.

5. The controller of claim 1, wherein the processing circuitry is further configured to determine a driving event based on the sensor data, the driver score being determined based on the determined positional deviation and the driving event.

6. The controller of claim 5, wherein the driving event comprises an acceleration event, a velocity event, a braking event, a directional-change event, a distracted-driver event, impaired-driver event, and/or a collision-avoidance event.

7. The controller of claim 5, wherein the sensor data is generated from a sensor of the vehicle and/or a sensor within or attached to the vehicle that is communicatively coupled to the controller.

8. The controller of claim 5, wherein the sensor data includes data from a mobile device within the vehicle.

9. The controller of claim 1, wherein the landmark included in the map data and/or the sensor data comprises: a lane marking, a road edge, a road arrow, a stop line, a cross walk, a traffic sign or light, or utility pole.

10. The controller of claim 1, wherein the driver score is determined based further on map metadata.

11. The controller of claim 1, wherein the processing circuitry is configured to:
  determine a running windowed average of vector differences for two or more landmarks over a path of the vehicle; and
  determine the driver score based on the running windowed average of vector differences.

12. The controller of claim 1, wherein the processing circuitry is configured to dynamically adjust a number of landmarks used to determine the positional deviation based on one or more characteristics of a driving segment.

13. The controller of claim 1, wherein the processing circuitry is configured to dynamically adjust a number of position vectors and/or reference position vectors used to determine the vector difference based on one or more characteristics of a driving segment.

14. The controller of claim 1, wherein: the reference point is a center of view of an image included in the sensor data, and
  a position of the reference point changes with respect to the landmark as the vehicle moves.

15. A controller of a vehicle, comprising:
  a communication interface configured to receive sensor data at a sampling frequency; and
  processing circuitry configured to, while navigating a driving environment:
    determine a landmark associated with a drivable path based on the sensor data;
    determine, based on the sensor data, a position vector between a current position of the vehicle on the drivable path and the determined landmark;
    determine, based on map data, a reference position vector between the current position and the determined landmark, the reference position vector being associated with an optimum path of the vehicle;
    determine a vector difference between the position vector of the determined landmark and the reference position vector of the determined landmark;
    selectively adjust the sampling frequency based upon the determined vector difference;
    determine, based upon a comparison of the determined vector difference to a threshold value, whether to include the determined vector difference as part of a driver score calculation; and
    calculate a driver score, based on the vector difference and a positive determination to include the determined vector difference as part of the driver score calculation, to thereby provide a continuous path monitoring to improve driver scoring accuracy, the driver score quantifying a deviation of the vehicle from the optimum path.

16. The controller of claim 15, wherein the processing circuitry is configured to compare the determined vector difference with the threshold value, the driver score being determined based on the comparison.

17. The controller of claim 15, wherein the communication interface is further configured to receive the reference position vector of the landmark.

18. The controller of claim 15, wherein the processing circuitry is configured to determine the reference position vector based on map data.

19. The controller of claim 18, wherein the communication interface is further configured to receive the map data.

20. A controller of a vehicle, comprising:
  interface means for receiving sensor data at a sampling frequency; and
  processing means for, while navigating a driving environment:
    determining a landmark associated with a drivable path based on the sensor data;
    determining, based on the sensor data, a position vector between a current position of the vehicle on the drivable path and the determined landmark;
    determining, based on map data, a reference position vector between the current position and the determined landmark, the reference position vector being associated with an optimum path of the vehicle;
    calculating a vector difference between the position vector of the determined landmark and the reference position vector of the determined landmark;
    selectively adjusting the sampling frequency based upon the calculated vector difference;
    determining, based upon a comparison of the calculated vector difference to a threshold value, whether to include the calculated vector difference as part of a driver score calculation; and
    calculating a driver score, based on the vector difference and a positive determination to include the calculated vector difference as part of the driver score calculation, to thereby provide a continuous path monitoring to improve driver scoring accuracy, the driver score quantifying a deviation of the vehicle from the optimum path.

* * * * *